July 18, 1933.  H. E. ELROD  1,918,742
SETTLING TANK
Filed June 15, 1931  2 Sheets-Sheet 1

Inventor
Henry E. Elrod
By Knight Bro.
Attorneys

July 18, 1933.  H. E. ELROD  1,918,742
SETTLING TANK
Filed June 15, 1931  2 Sheets-Sheet 2

Inventor
Henry E. Elrod
By Knight Bros
Attorney

Patented July 18, 1933

1,918,742

UNITED STATES PATENT OFFICE

HENRY E. ELROD, OF HOUSTON, TEXAS

SETTLING TANK

Application filed June 15, 1931. Serial No. 544,668.

This invention relates to improvements in settling tanks wherein improved means for the removal of the settled sludge and accumulated scum are provided.

It is an object of my invention to provide a rugged scraping structure for the bottom of a settling tank to effect the removal of the settled sludge which is particularly adapted for use in tanks of any length.

It is a further object of my invention to provide an improved form of skimmer for the removal of scum accumulated at the top of the settling tank.

It is a further object of my invention to so correlate my sludge and scum removing devices that they both combine to give me a mode of operation which presents advantages over the independent operation of similar devices used heretofore.

Further objects and advantages will appear from the following description and appended claims.

In the drawings:

Fig. 4 shows an elevation of my sludge removing device in another position of operation.

Figure 1:
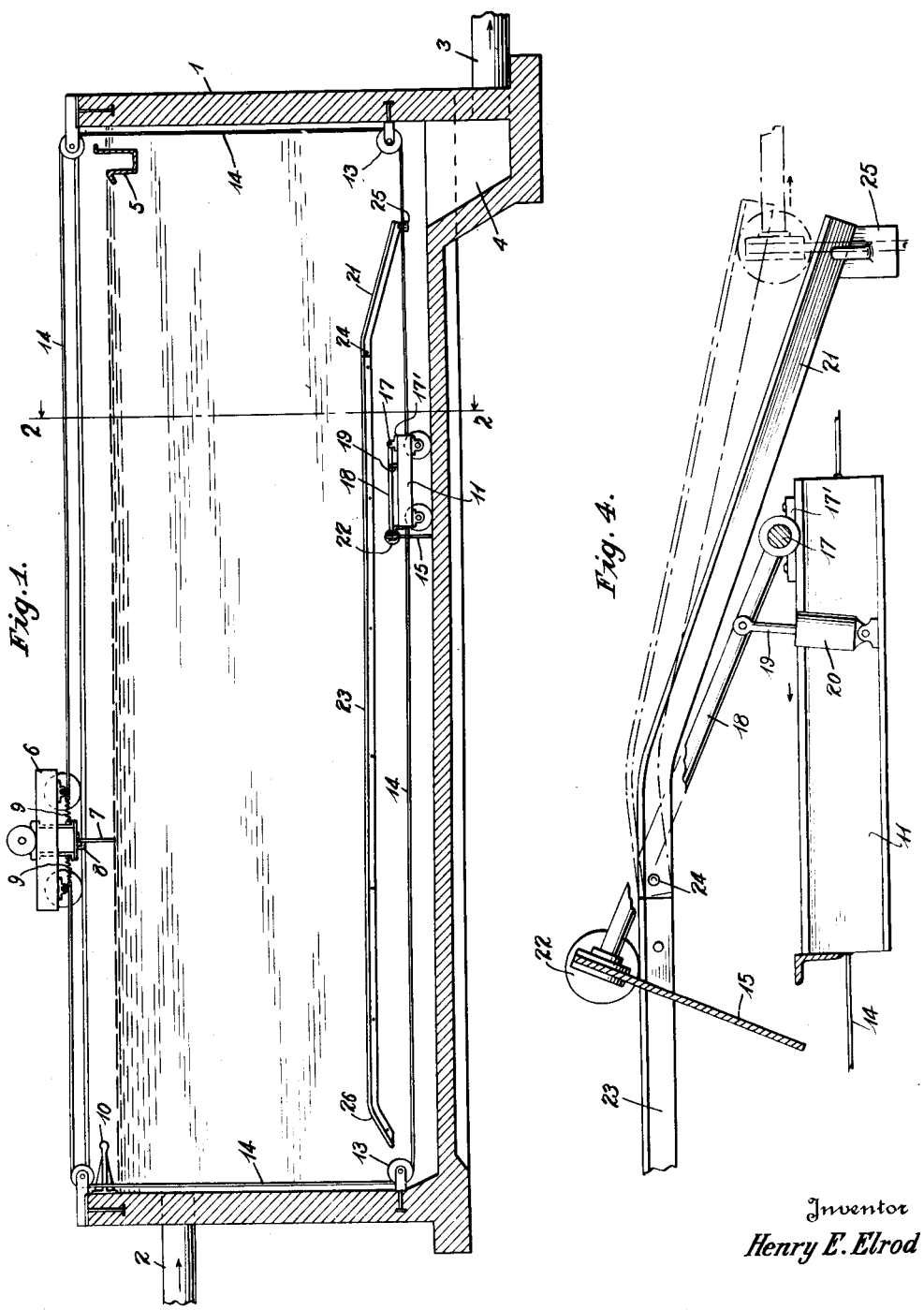
Fig. 1 is a longitudinal sectional view of my settling tank.
Figure 2:
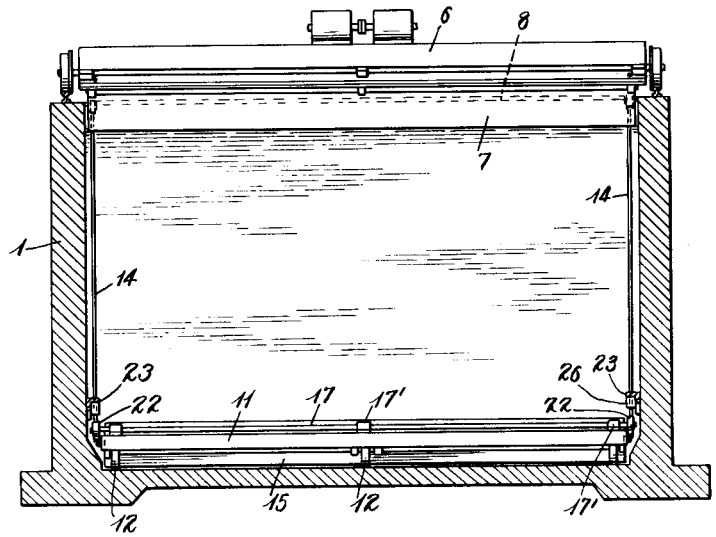
Fig. 2 is a sectional view along line 2—2 of Fig. 1.
Figure 3:
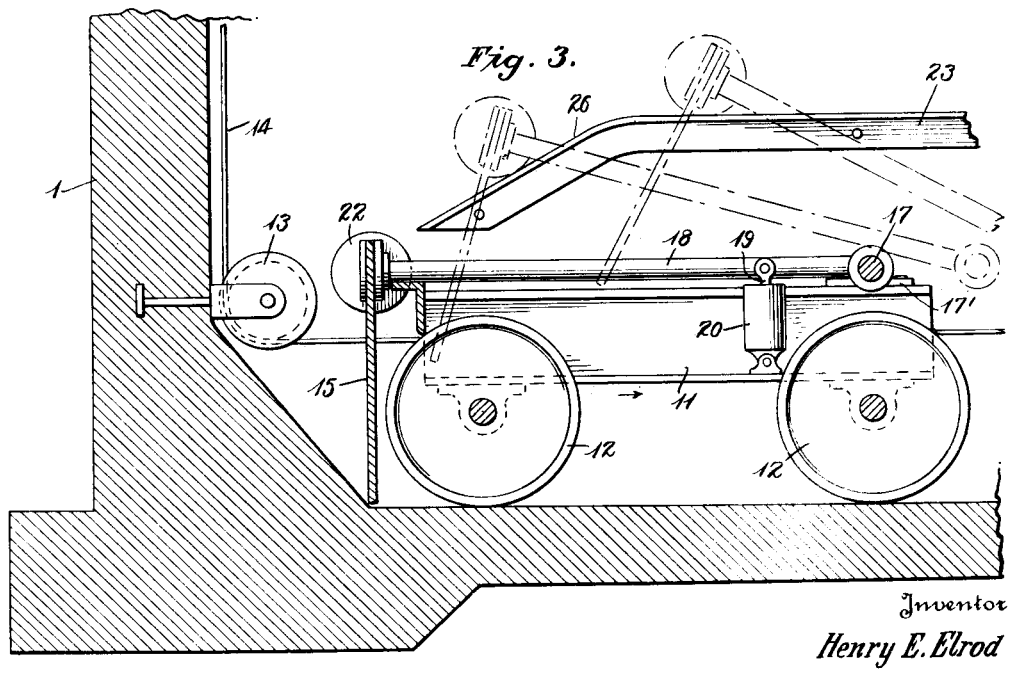
Fig. 3 is a detailed elevation partly in section of my sludge removing device.

In Fig. 1, a settling tank of desired length, 1, is shown. Inlet pipe 2 is disposed near the top of the tank. The sludge hopper or hoppers 4 assocated with sludge outlet pipe 3 are disposed at the bottom of the tank. A scum trough 5 is provided at one end of the tank near its top. A travelling crane 6 with a depending fin 7 is adapted to reciprocate along the length of the tank to force the accumulated scum into trough 5 for suitable disposition.

At the bottom of the tank, I provide a travelling member 11 simulating a buggy composed of structural members mounted on wheels 12 which may or may not run on rails at the bottom of the tank. This travelling buggy is actuated by flexible members 14 connected to opposite ends of it, which are threaded through sheaves 13 which are fixed in the tank structure. Flexible members 14 are in turn connected at the opposite ends through the intermediary of springs 9 to opposite sides of crane 6. A scraper blade 15, normally in vertical position, is rigidly fixed to pivoted arms 18 which are adapted for rotation together with a pivot shaft 17 fitted in bearings 17' mounted upon the top of buggy 11. In the course of movement of the crane 6 toward the left end of the tank, the buggy 11 travels toward the right, at which time arms 18 rest upon the back angle iron of the buggy and support depending blade 15 in a definite position with its bottom edge close to the floor so that it scrapes the sludge settled on the tank bottom toward the outlet hopper.

On each side of the tank is mounted a horizontal rail consisting of three portions, namely a fixed horizontal portion 23 extending the greater extent of the tank, a pivoted portion 21 adjacent the sludge outlet end, and a fixed downwardly sloped portion 26 at the opposite end. Portion 21 is normally adapted to rest within a stop member 25 mounted on the side wall of the tank. This portion 21 is adapted to be freely pivoted in an upward direction; and when the buggy 11 nears the end of its travel toward the right, the buggy raises this portion of the track about pivot 24. The track portion 21 drops back into position after the buggy has passed the same. In the course of reverse movement of the buggy, rollers 22 mounted upon the top extremities of scraper 15 engage the track 21 and cause member 15 to be raised from the tank bottom by the pivotal motion of rods 18 and shaft 17. The buggy is thus conveyed to the opposite end of the tank by movement of the crane 6 at the top thereof through flexible members 14. Not until the buggy is close to the opposite end of the tank do the rollers 22 at each side of the buggy roll or slide down incline 26 to place the scraper element 15 in position for another operation of movement toward the sludge outlet end.

In order to cushion the drop of element 15 from its elevated position during its rearward movement to its position adjacent the bottom of the tank at the end of that movement, a dashpot element is arranged to cooperate between the buggy and the pivotal members. This may take the form of a chamber 20 having a small aperture in the bottom thereof, which in the course of the raising operation, is filled with water by the upward actuation of a suitable piston therein connected through rod 19 to pivoted member 18. This serves to cushion the drop of that member when the water is forced through this restricted aperture.

I incorporate a refinement in my scum removing device by rendering the scraper fin or blade 7 freely pivotal in one direction; namely when the same is travelling toward the left end of the tank, illustrated in Fig. 1. The resistance of the scum will tend to turn this blade 7 although some will be carried therewith. When the crane reaches the left extremity of the tank, cast iron arms are adapted to strike fin 7 to raise it and to allow the scum accumulated before it to flow under it. In the reverse operation of the crane, when the same tendency for fin 7 to yield against the resistance of the scum would also be evident, this movement is prevented by stops 8 upon the crane which confines the scraping fin 7 in a vertical direction to effectively convey the scum upon the surface of the sewage toward the trough 5 for suitable disposal. The springs 9 connected between the flexible members 14 which actuate the buggy at the bottom of the tank and the crane 6 serve a double purpose. In the first place, the slack in the cable is automatically taken up. In the second place, a freedom of movement is allowed the crane 6 to completely effect its cycle of movement despite the fact that the buggy at the bottom of the tank has already completed its movement.

In my arrangement as illustrated, it is seen that when my sludge removing device is operating toward the right, my scum removing device is passing through its idle portion of the cycle. Likewise when my scum removing device is operative, the sludge removing device is being conveyed back idly to its normal position for operation. By this design the load upon my system is equalized which results in both more economical and satisfactory operation. Although my embodiment herein disclosed contemplates an electrically driven crane, any other type of drive, even manual means, may be employed.

Having described my invention, I claim:

1. In a sewage settling tank, a travelling crane adapted to travel the length of said tank along the top thereof, a pivoted depending blade extending from said crane adapted to skim the surface of the sewage, a trough at one end of said tank, means adapted to limit the position of said blade in a substantially vertical plane in the course of movement of said blade towards said trough, and a projection at the other end of said tank adapted to engage said depending blade at the end of its movement toward said other end to thereby raise said blade.

2. In a sewage settling tank, a travelling crane adapted to travel the length of said tank along the top thereof, a pivoted depending blade extending from said crane adapted to skim the surface of the sewage, a scum trough at one end of said tank adapted to receive the scum conveyed by said blade in its operative movement towards the said end of said tank, a pivoted scraper adapted to traverse the bottom of said tank to remove the settled sludge, a sludge trough at one end of the bottom of said tank adapted to receive the sludge conveyed by said scraper in its operative movement towards said end of said tank, and means for actuating said sludge scraper by said travelling crane in such a manner that the operating function of the scum remover and that of the sludge scraper occur alternately.

3. In a sewage settling tank, a travelling crane adapted to travel the length of said tank along the top thereof, a pivoted depending blade extending from said crane adapted to skim the surface of the sewage, a scum trough at one end of said tank adapted to receive the scum conveyed by said blade in its operative movement toward the said end of said tank, a travelling member adapted to traverse the length of said tank along the bottom thereof, a scraper blade pivotally connected to said member adapted to remove the settled sludge when in operative position, a sludge trough at one end of the bottom of said tank adapted to receive the sludge conveyed by said scraper in its operative movement toward said end of said tank, means for actuating said sludge scraper by said travelling crane in such a manner that the operating function of the scum remover and that of the sludge scraper occur alternately, comprising cable connections between said travelling member and said crane, and springs interposed in said connections.

4. In a settling tank, a carriage adapted to travel along the tank above the liquid level, a skimming fin depending from said carriage adapted to skim the surface of the liquid, a sludge removing device and means supporting the same to travel along the bottom of the tank, said sludge removing device supporting means being connected to said carriage so as to derive its motion therefrom.

5. In a settling tank, a carriage adapted to travel along the tank above the liquid level, a skimming fin depending from said carriage, a buggy adapted to travel along the bottom of the tank and having a short length in the direction of its travel, a scraping blade on said buggy for removing sediment from the bottom of the tank, and connections between said carriage and buggy whereby the latter derives its motion.

6. In a settling tank, a traveling support, means to cause said support to travel back and forth along the bottom of the tank, a depending blade pivotally connected to said member disposed adjacent the floor of the tank during the forward travel of said support, said support being sufficiently short in the direction of its travel so that it can carry said blade substantially the full length of the tank, tracks on the side walls of the tank comprising pivoted portions adjacent one end of the tank, and engaging members associated with said depending blade adapted to pass under and raise the pivoted portions of said tracks at the conclusion of the movement of said support in one direction and adapted to ride upon said tracks during the reverse movement of said support, said pivoted portions of said tracks being inclined upwardly from their extremities so as to raise said depending blade on its pivot from the floor of the tank during the reverse travel of said support.

7. In a settling tank, sludge scraping mechanism comprising a support adapted to run along the bottom of the tank and having a short length in the direction of its travel, a scraping blade mounted on said support with its bottom edge close to the floor of the tank, a propulsion device adapted to travel along the top of the tank, flexible connections between said propulsion device and said support, said connections running from said propulsion device toward the opposite ends of the tank, down the end walls of the tank and inward to said support, whereby said support can be moved by said propulsion device from end to end of the tank, and means for raising said scraper from the floor of the tank as said support travels in one direction.

8. In a sewage settling tank, a travelling crane adapted to travel the length of said tank along the top thereof, a pivoted depending blade extending from said crane adapted to skim the surface of the sewage, a scum trough at one end of said tank adapted to receive the scum conveyed by said blade in its operative movement towards the said end of said tank, a pivoted scraper adapted to traverse the bottom of said tank to remove the settled sludge, a sludge trough at one end of the bottom of said tank adapted to receive the sludge conveyed by said scraper in its operative movement towards said end of said tank, and means for actuating said sludge scraper by said travelling crane.

HENRY E. ELROD.